No. 774,884. PATENTED NOV. 15, 1904.
C. B. JOHNSTON.
SYSTEM OF WAY BILLING BAGGAGE.
APPLICATION FILED MAY 13, 1904.

NO MODEL. 2 SHEETS—SHEET 1.

Fig. 1.

Fig. 2.

Witnesses:

No. 774,884. PATENTED NOV. 15, 1904.
C. B. JOHNSTON.
SYSTEM OF WAY BILLING BAGGAGE.
APPLICATION FILED MAY 13, 1904.

NO MODEL. 2 SHEETS—SHEET 2.

Fig. 3.

Fig. 4.

Witnesses:

Inventor:
C. B. Johnston
By
Attys.

No. 774,884. Patented November 15, 1904.

UNITED STATES PATENT OFFICE.

CLARENCE B. JOHNSTON, OF ST. LOUIS, MISSOURI.

SYSTEM OF WAY-BILLING BAGGAGE.

SPECIFICATION forming part of Letters Patent No. 774,884, dated November 15, 1904.

Application filed May 13, 1904. Serial No. 207,823. (No model.)

*To all whom it may concern:*

Be it known that I, CLARENCE B. JOHNSTON, a citizen of the United States, and a resident of the city of St. Louis and State of Missouri, have invented a new and useful System of Way-Billing Baggage, of which the following is a specification.

The system of way-billing baggage now commonly practiced by transportation companies is as follows: The station-baggageman makes out a way-bill in duplicate of all baggage delivered by him to the train-baggageman, one copy of which is signed by the train-baggageman and forwarded to the general baggage agent and the other copy is delivered to the train-baggageman. For every station at which the train-baggageman delivers baggage he makes out a way-bill of all such baggage, and this way-bill is supposed to be signed by the station-baggageman (if time permits) and then forwarded to the general baggage agent. Each train-baggageman is also required to make out a way-bill in duplicate for every train-baggageman to whom he delivers baggage, one copy of said way-bill being signed by the receiving train-baggageman and the other copy being delivered to said receiving train-baggageman. All of the baggagemen are required to make manifests and daily reports of all baggage handled by them. In addition to the way-bills the various station-baggagemen are required to make memoranda and reports concerning charges of various kinds and other matter. In consequence of the present system the number of way-bills upon which each piece of baggage is entered is twice as large as the number of baggagemen through whose hands it is transmitted until it reaches its destination, and in many cases there are a large number of additional reports concerning said baggage, and, as the check-number and description of baggage are written in on each way-bill and report, mistakes and erasures are so frequent as to very seriously impair the value of the record. So, too, instead of each piece of baggage having a separate record the record of all of the baggage handled on a train is mixed up in a large mass of papers.

The principal objects of the present invention are to simplify the clerical work of the baggagemen, to reduce the chance of making mistakes, to shorten, systemize, and perfect the record of the baggage, and to facilitate the tracing of the baggage.

My invention consists in the system and devices hereinafter described and claimed.

In the accompanying drawings, which form part of this specification, and wherein like symbols refer to like parts wherever they occur, Figure 1 is a front view of a blank or form conforming to my invention and comprising an agent's stub, an owner's check, a strap-check, and a way-bill. Fig. 2 is a front view of a similar blank comprising also a charge-check. Fig. 3 is a back view of the form shown in Fig. 1. Fig. 4 is a view of the register of way-bills.

My blank or form consists of a long strip divided into four or more sections separated from each other by lines of perforations.

At one end of the form is a binding-strip 1, whereby the form may be bound along with a lot of duplicates thereof in book form. The section 2 next to the binding-strip constitutes the agent's stub and has appropriately-designated spaces thereon for indicating the date of issue of the way-bill, (including its special number, if any,) the number of the train upon which the baggage is sent, the name of the train-baggageman, the station of origin, and the station of destination of the baggage, together with such other information as may be appropriate for the agent's stub. The agent's stub also has printed thereon the name of the company issuing it and appropriate matter to designate the character of the way-bill and checks attached thereto. Said agent's stub also has a designating or identification number, which number is printed upon each of the sections of the form. The second section 3, which is intended for delivery to the owner of the baggage, contains the name of the railroad or transportation-line and words indicating the classification of the baggage, such as "local" or "through" or the like, and containing also properly-designated spaces for inserting the stations of origin and destination of the baggage, together with the identification-number common to all sections of the form. The third section 4, which is intended to be inserted in a check or label holder, and thereby fastened to the baggage with a strap, contains substantially the same matter and spaces as the owner's check. The strap-check, however, has a slot 5 formed therein of suitable size for the strap to pass through. The outermost section 6, which constitutes the way-bill, comprises appropriately-designated spaces for its date of issue, (including in some cases its special number of that date,) the stations of origin and destination, and for the description and condition of the baggage. It also has a series of appropriately-designated spaces for the check-marks of the agents and train-baggagemen, together with a corresponding series of appropriately-designated spaces for indicating the condition of the baggage when received by the user of the particular check-mark. This way-bill also comprises an appropriately-designated space for the insertion of the stamp of the first train-baggageman who receives the baggage, and it also contains a blank report with appropriately-designated spaces for the station-number, train-number, and time and the signature of the station agent. It also contains appropriately-designated spaces for the stamps or signatures of agents at transfer-points. This way-bill 6 also contains appropriately-designated spaces for the stamps of the train-baggagemen. Preferably these spaces are upon the back of the way-bill. Likewise upon the back of the way-bill are printed instruction and matters of information and spaces for remarks.

My system contemplates the use by each baggageman of a register of way-bills or receipt-book 7 of substantially the form shown in Fig. 4, containing appropriately-headed columns for memoranda to identify the way-bills and for the signatures of the baggageman acknowledging receipt thereof.

In practice my system would be used as follows: The station-baggageman fills out upon his stub the date of the way-bill, (and its special number, if desired,) the name of the stations of origin and destination, and the description and condition of the baggage. He then fills in the names of the stations of origin and destination upon the owner's check and the strap-check and then fills in upon the way-bill all of the matter inserted upon the agent's stub except the name of the train-baggageman. Then the strap-check is placed in the label-holder and affixed to the baggage, and the owner's check is delivered to the owner. The way-bill is delivered, along with the baggage, to the train-baggageman, who signs the agent's stub or his register of way-bills. The first train-baggageman also affixes his stamp at the place designated therefor.

There is a separate way-bill for each piece of baggage, and the baggageman's work of checking up the baggage against the way-bills consists merely in arranging his way-bills in such order as to best suit his own convenience—as, for instance, consecutively with reference to the common identification-numbers, or with reference to station-numbers, or alphabetically with reference to the names of stations—and then as he finds each piece of baggage entering on the corresponding way-bill his check-mark and condition-mark in the spaces provided and designated therefor. The only other clerical work required of a train-baggageman is to enter on his register a memoradum sufficient to identify each way-bill and to see that the agent who receives the way-bill signs therefor in the register.

When the first train-baggageman reaches the end of his run, he delivers the baggage, together with the way-bill, to the second train-baggageman, who signs the first one's register and then checks up the baggage against the way-bills, as above noted—that is, for each piece he inserts his check-mark in the second of the spaces provided therefor on its way-bill and enters its condition in the corresponding space provided for the purpose and affixes his stamp in the space designated therefor. In like manner the next succeeding train-baggageman to receive the baggage receipts for the way-bills on the register of the preceding baggageman and enters his check-mark and annotation of condition and stamp on each way-bill. When the baggage arrives at the station of destination, the station agent or baggageman signs the train-baggageman's way-bill register and also signs the receipt for the baggage provided therefor on the way-bill. In case the baggage is not received by the baggageman to whom the way-bill is delivered he enters the word "short" in the space designated for condition.

It is noted that the way-bill is made out by the original station-baggageman and that this way-bill follows the baggage from the station of origin to the station of destination and that said way-bill contains a printed identification-number which is likewise printed upon all of the other sections of the form, so that the train-baggagemen are relieved entirely of the labor of making out way-bills.

Obviously the forms admit of considerable variation without departing from my invention. Thus the agent's stub and the way-bill may contain a printed memorandum or an appropriately-designated space for a memorandum of the route or station by way of which the baggage is to be carried. So, too, in cases where it may be necessary to way-bill the baggage to a station different from its actual destination the form may provide therefor. So, too, it is desirable to provide upon the way-bill appropriately-designated spaces for the stamp or signature of baggage agents at points of transfer, all as indicated in Fig. 1.

In order to economize the time and labor of the station-baggageman, it is advantageous to have the name of the station of origin or of destination, or of both, printed on the forms. In the case of stations from which much baggage is sent it is preferable to have the name of said station printed on the form; but in case of stations from which small amounts of baggage are sent it is preferable to supply the agents with forms on which the station of destination is printed, in which case the same forms may serve for various stations. When the station of origin and the station of destination have large quantities of baggage passing between them, it is preferable to have the names of both stations printed on the form.

In the case of excess baggage—that is, in cases where the station-baggageman is required to collect any charges—the form comprises an additional section or coupon 8, which may be designated as the "auditor's stub." (See Fig. 2.) In this case the auditor's stub is a substantial duplicate of the owner's check and of the strap-check, upon all of which are provided appropriately-designated spaces for memoranda of the charges.

The principal advantages of my form are as follows: The identification-number common to all of its sections eliminates one of the most prolific sources of error in the present system of way-billing. Again, the way-bill section of the form serves as a forwarding way-bill as between the station-baggageman and the train-baggageman, as a train-baggage way-bill as between said train-baggageman and the train-baggageman to whom he delivers it, as a delivering way-bill as between the train-baggageman and the station agent to whom he delivers it, and as a receiving way-bill at the station of destination, and finally it constitutes a complete record of the transportation of the baggage, containing all of the matter which in the present system of way-billing is scattered through a large mass of papers. Again, as every person who receives a way-bill has to receipt therefor and is responsible for its preservation there is much less danger of losing it than in the present system. Again, the entire record of the transportation of each piece of baggage is complete on the way-bill therefor instead of being mixed up with the entries of all of the other baggage on the train. Again, the train-baggagemen are relieved of the work not only of making out way-bills, but also of making written reports to the general baggage agent, as there is no occasion for such reports. Again, if the way-bill is lost the responsibilty therefor and the baggage itself can be traced from register to register by the receipts signed therein.

The forms hereinbefore described admit of considerable modification without departing from my invention, and I do not wish to be restricted to the details of said forms.

What I claim is—

1. A form comprising sections, said sections comprising an agent's stub, an owner's check, a strap-check and a way-bill, each containing a common identification-number and matter appropriate to the particular section.

2. A form comprising sections, said sections comprising an agent's stub, an auditor's stub, an owner's check, a strap-check and a way-bill, each containing a common identification-number and matter appropriate to the particular section.

3. A form comprising sections, said sections comprising an agent's stub, an owner's check, a strap-check and a way-bill, each containing a common identification-number and matter appropriate to the particular section, and said way-bill comprising appropriately-designated spaces for the baggagemen's marks.

4. A form comprising sections, said sections comprising an agent's stub, an auditor's stub, an owner's check, a strap-check and a way-bill, each containing a common identification-number and matter appropriate to the particular section, and said way-bill comprising appropriately-designated spaces for the baggagemen's marks.

5. A system of way-billing baggage comprising a printed form having sections constituting an agent's stub, an owner's check, a strap-check and a way-bill, all having a common identification-number and said way-bill having appropriately-designated spaces for baggagemen's marks, and a register of way-bills for each baggageman, said register comprising blank receipts and having appropriately-headed blank columns for matter descriptive of said way-bills and for the signatures of the persons to whom said way-bills are delivered.

6. A system of way-billing baggage comprising a printed form having sections constituting an agent's stub, an owner's check, a strap-check and a way-bill, all having a common identification-number and said way-bill having appropriately-designated spaces for baggagemen's marks, and a blank receipt, and a register of way-bills for each baggageman, said register comprising blank receipts and having appropriately-headed blank columns for matter descriptive of said way-bills and for the signatures of persons to whom said way-bills are delivered.

CLARENCE B. JOHNSTON.

In presence of—
GOLDBURN H. WILSON,
JAMES A. CARR.